Figure 5:
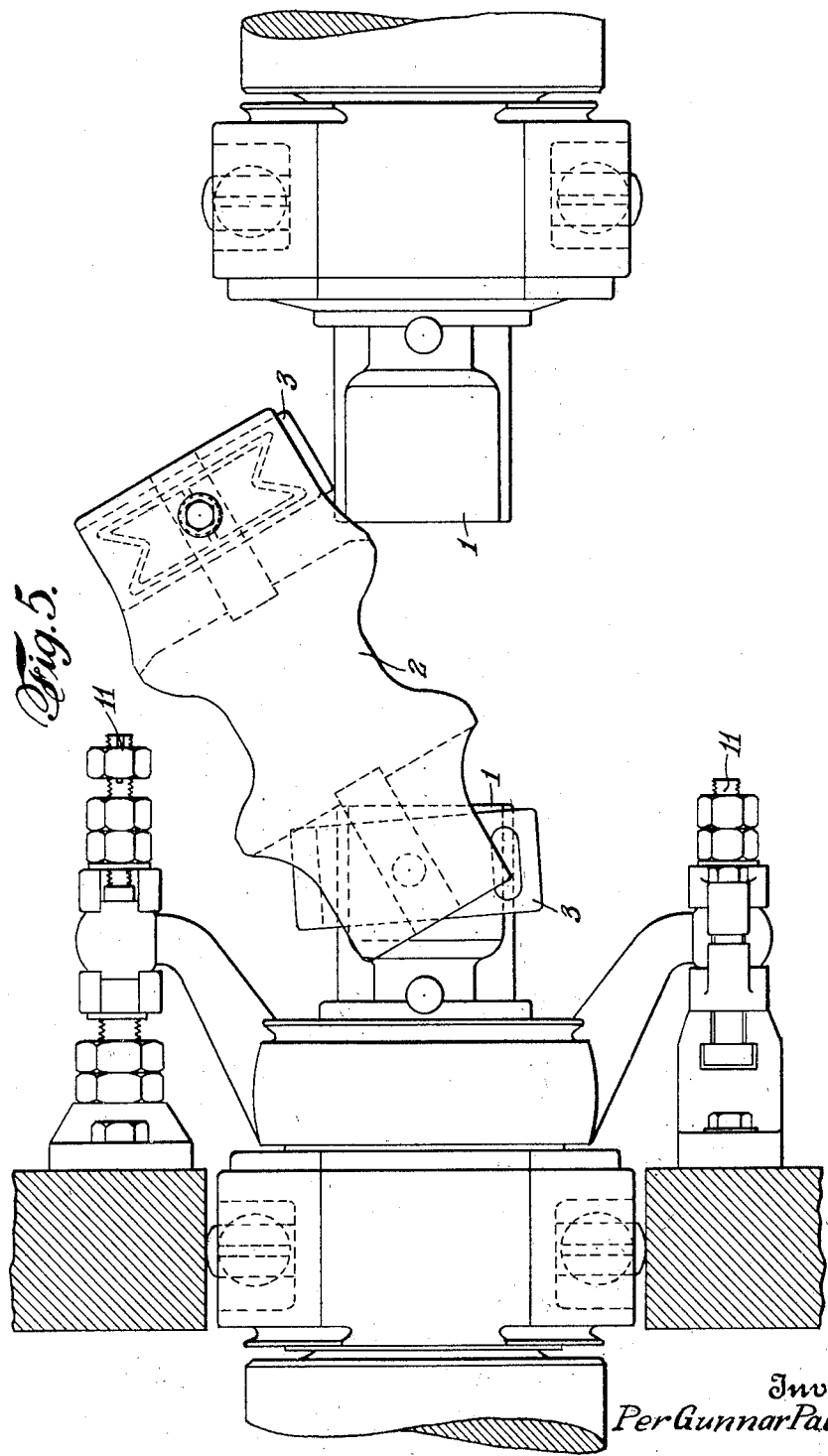

Nov. 12, 1929.                P. G. PALMGREN                1,734,978
                        COUPLING BOX FOR ROLLING MILLS
                        Filed Dec. 31, 1927    3 Sheets-Sheet 1
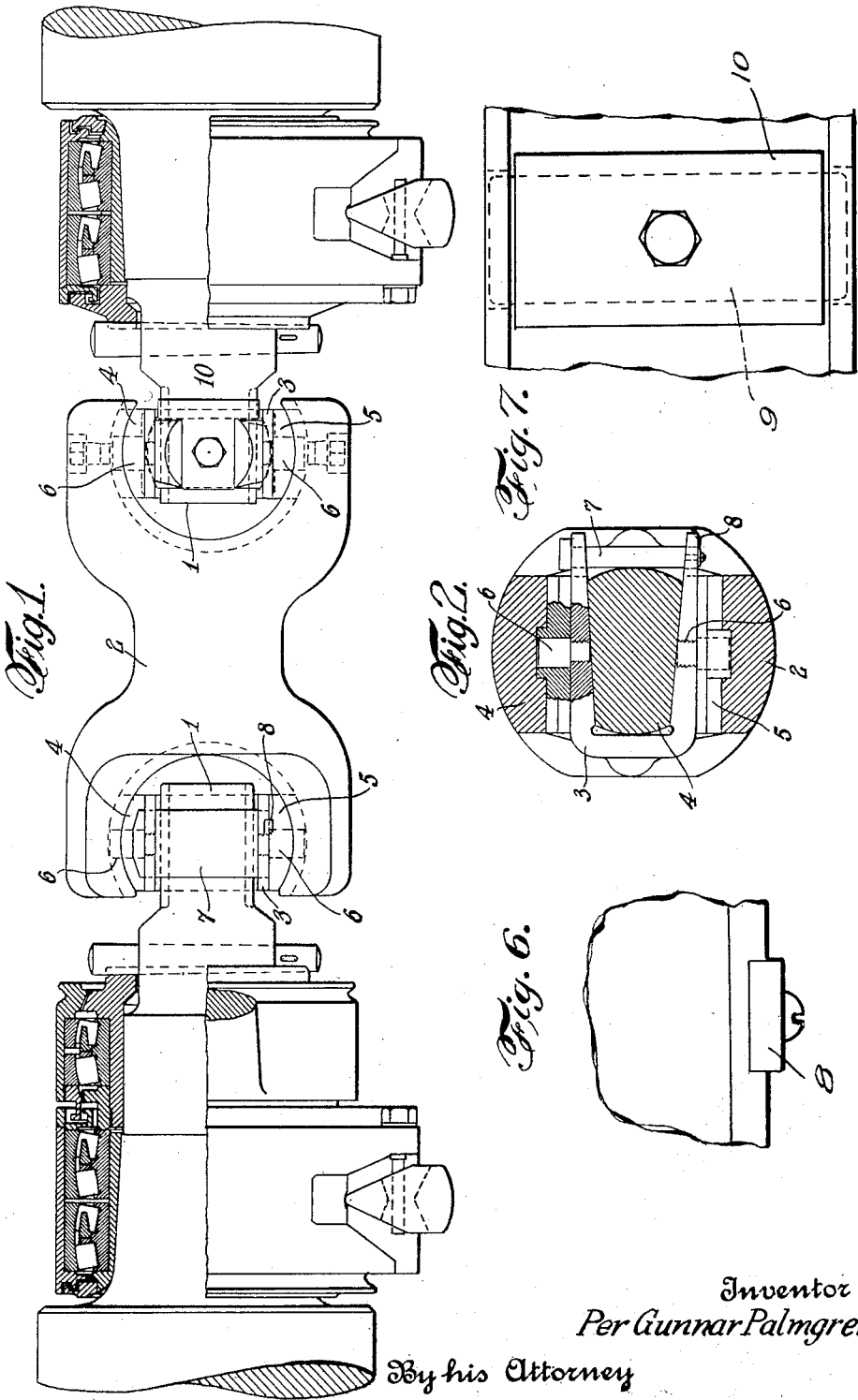
Inventor
Per Gunnar Palmgren
By his Attorney

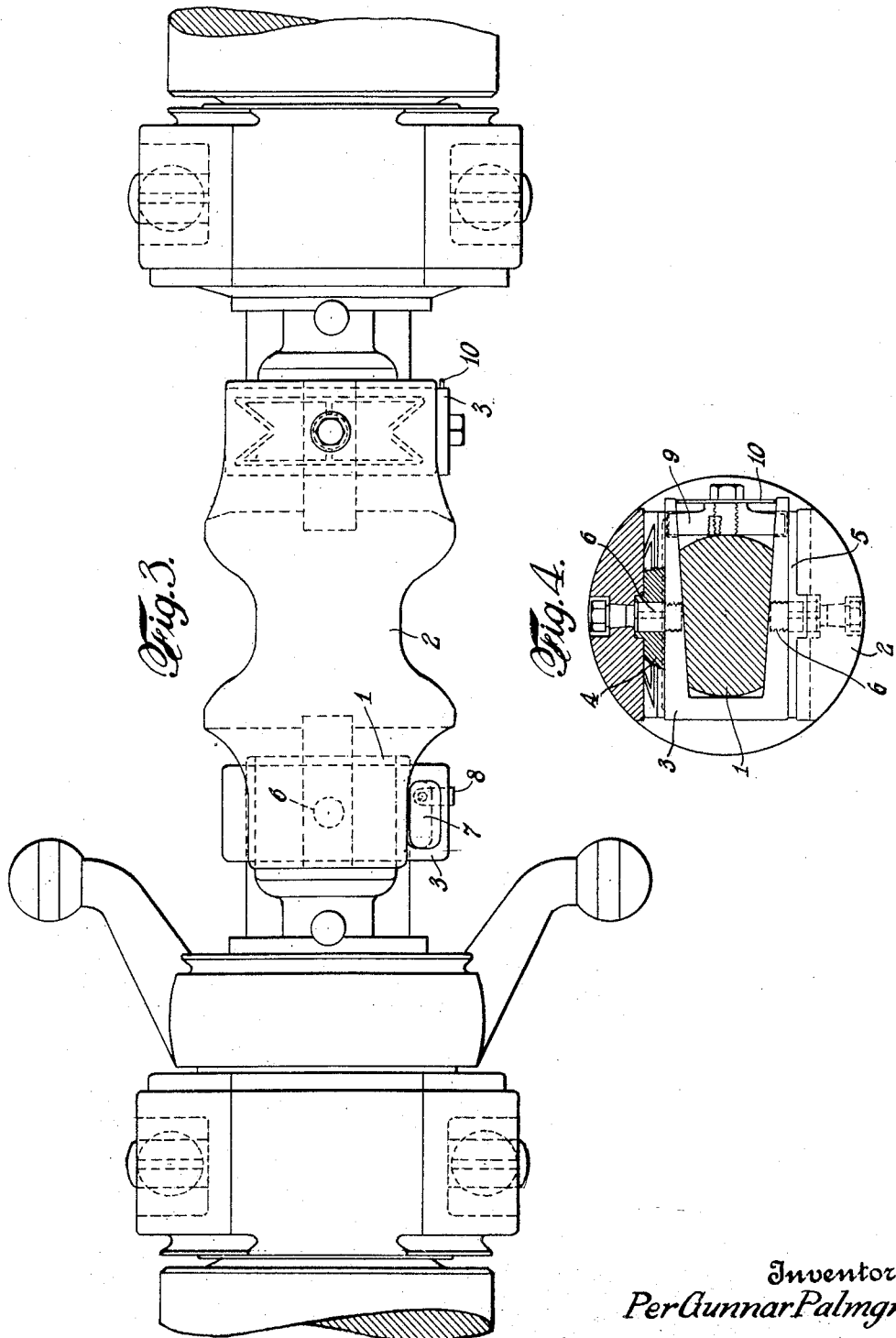

Nov. 12, 1929.　　　P. G. PALMGREN　　　1,734,978
COUPLING BOX FOR ROLLING MILLS
Filed Dec. 31, 1927　　3 Sheets-Sheet 3

Inventor
Per Gunnar Palmgren
By his Attorney

Patented Nov. 12, 1929

1,734,978

UNITED STATES PATENT OFFICE

PER GUNNAR PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN

COUPLING BOX FOR ROLLING MILLS

Application filed December 31, 1927, Serial No. 243,833, and in Sweden January 3, 1927.

This invention relates to improvements in coupling boxes for rolling mills, and the like.

The object of the invention is to facilitate the mounting and to obtain a coupling which, when being dismantled, has blocks and fork remaining in the coupling box.

The invention consists, chiefly, in the necks being faced off to a wedge shape and the sleeve surrounding the neck substituted by a fork in which the neck can be pushed in laterally and secured by means of a suitable locking arrangement. This locking arrangement suitably consists of a wedge or a rotary washer inserted in corresponding recesses in the ends of the fork and secured by means of a spring or the like.

In the drawings, two different forms of embodiments are shown by way of example. One form of embodiment is shown to the left in Figs. 1 and 3 in elevation (partial section) and plan view and in Fig. 2 in cross section. The other form of embodiment is shown in the right in Figs. 1 and 3 and in cross section in Fig. 4. Fig. 5 is a plan view showing the mounting of the coupling box. Fig. 6 is a detail looking at the device in the Fig. 2 position from the right-hand side, and Fig. 7 is a similar detail of the construction shown in Fig. 4.

Referring to the drawings, the neck ends 1 faced-off obliquely in two places are shown inserted in the ends of a coupling box 2. A V-shaped fork 3, or the like, inserted in the end of the coupling box is threaded on to the faced-off neck end and is surrounded by blocks 4, 5 fitting in cylindrical (or tapering) recesses in the coupling box. Screws 6 are screwed into the fork 3 and entering the blocks 4, 5, by means of which these latter are prevented from leaving their place but are free to turn around an axis perpendicular to the roll neck.

For the sake of retaining the coupling box on the neck there is provided a locking device which in the form of embodiment shown in Fig. 2 (and at the left end of the coupling box in Figs. 1, 3 and 5) consists of a lock plate 7, or the like, inserted in suitable recesses in the ends of the fork and secured by means of a lockwasher 8, fastened to the lock plate 7, by means of a screw and intended to hold the latter in place. In the form of embodiment shown in Fig. 4 (and at the right end of the coupling box in Figs. 1, 3 and 5), the locking arrangement consists of a lock plate 9, or the like, which can be turned so as to fit into suitable recesses in the fork ends and is secured by means of a lockwasher 10, which may be bent into its illustrated locking position in a well-known manner.

The mounting of the coupling box is shown in Fig. 5. One of its ends is brought obliquely over the one (left) end of the neck so that the fork placed in the box is caused to surround the neck end, after which the box is swung over the other (right) neck end from the skew position shown in Fig. 5. The mounting is facilitated through the skew facing-off of the neck ends and the corresponding V-shape of the fork. By such a mounting, the arrangement will have the advantage that the mounting is not prevented by the ordinary far outwardly projecting adjusting screws 11. Furthermore the described arrangement will also have the advantages that, in dismantling, blocks and fork remain in the coupling box where they are protected against sand and grit.

I claim:

1. In coupling boxes for rolling mills wherein the roll necks are faced off to a wedge shape, the combination with a coupling box, of an open sided fork shaped to conform to the roll neck and into which it can be inserted from the side, and locking means for securing the neck in the fork.

2. An arrangement according to claim 1 characterized by the locking means consisting of a plate, recesses being formed in the ends of the fork for holding the plate in the recesses.

3. The combination with a rolling mill roll having a neck wedge shaped in cross section; of a coupling box, a fork universally jointed to said coupling box and having side members tapered to fit the wedge shaped roll neck and engaged laterally thereon, and means to releasably hold the fork on the roll neck.

4. The combination with a rolling mill roll having a neck wedge shaped in cross section;

of a coupling box, a fork universally jointed to said coupling box and having side members tapered to fit the wedge shaped roll neck and engaged laterally thereon, the arms of said fork having alined openings adjacent their free ends, and a key member engaging in said openings and closing the open end of the fork.

5. The combination with a rolling mill roll having a neck wedge shaped in cross section; of a coupling box, a fork universally jointed to said coupling box and having side members tapered to fit the wedge shaped roll neck and engaged laterally thereon, the arms of said fork having alined openings adjacent their free ends, a key member engaging in said openings and closing the open end of the fork, and means to prevent retraction of said key member.

6. The combination with a rolling mill roll having a neck provided with opposed flat sides; of a yoke engaging laterally on said neck with its sides engaging the flattened sides of the neck, means to releasably hold the yoke in position on the neck, a roll coupling having a forked end provided with an arcuate guide groove lying in a plane radial of the axis of the coupling and passed through the arms of the forked coupling end, a pair of bearing members fitting in said forked end of the coupling and provided with rib portions extending into the guide grooves, said bearing members being slidable along the grooved portion of the coupling member, and alined pivot pins extending outwardly from the arms of the yoke and journaled in said bearing member.

In testimony whereof I have signed my name.

PER GUNNAR PALMGREN.